Figure 2A:
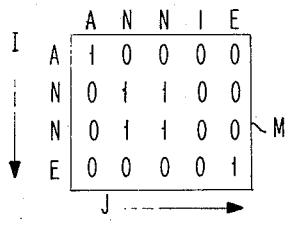
Figure 2B:
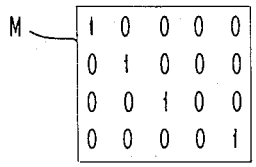
Figure 2C:
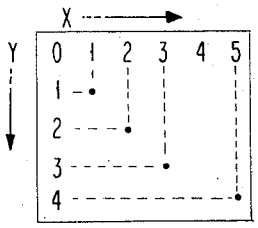
Figure 1:
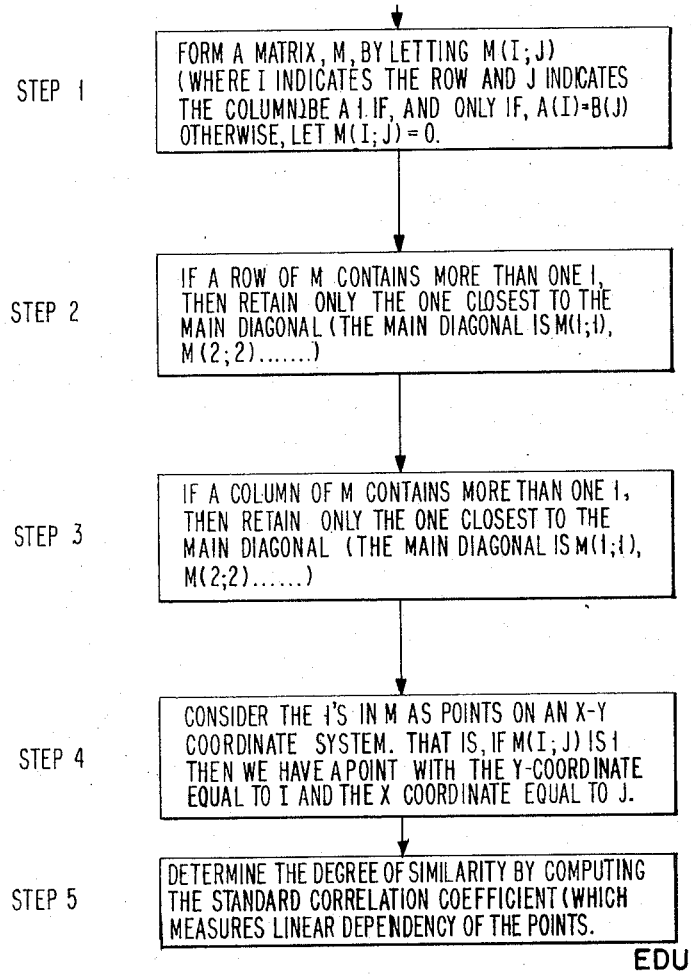
Figure 3:
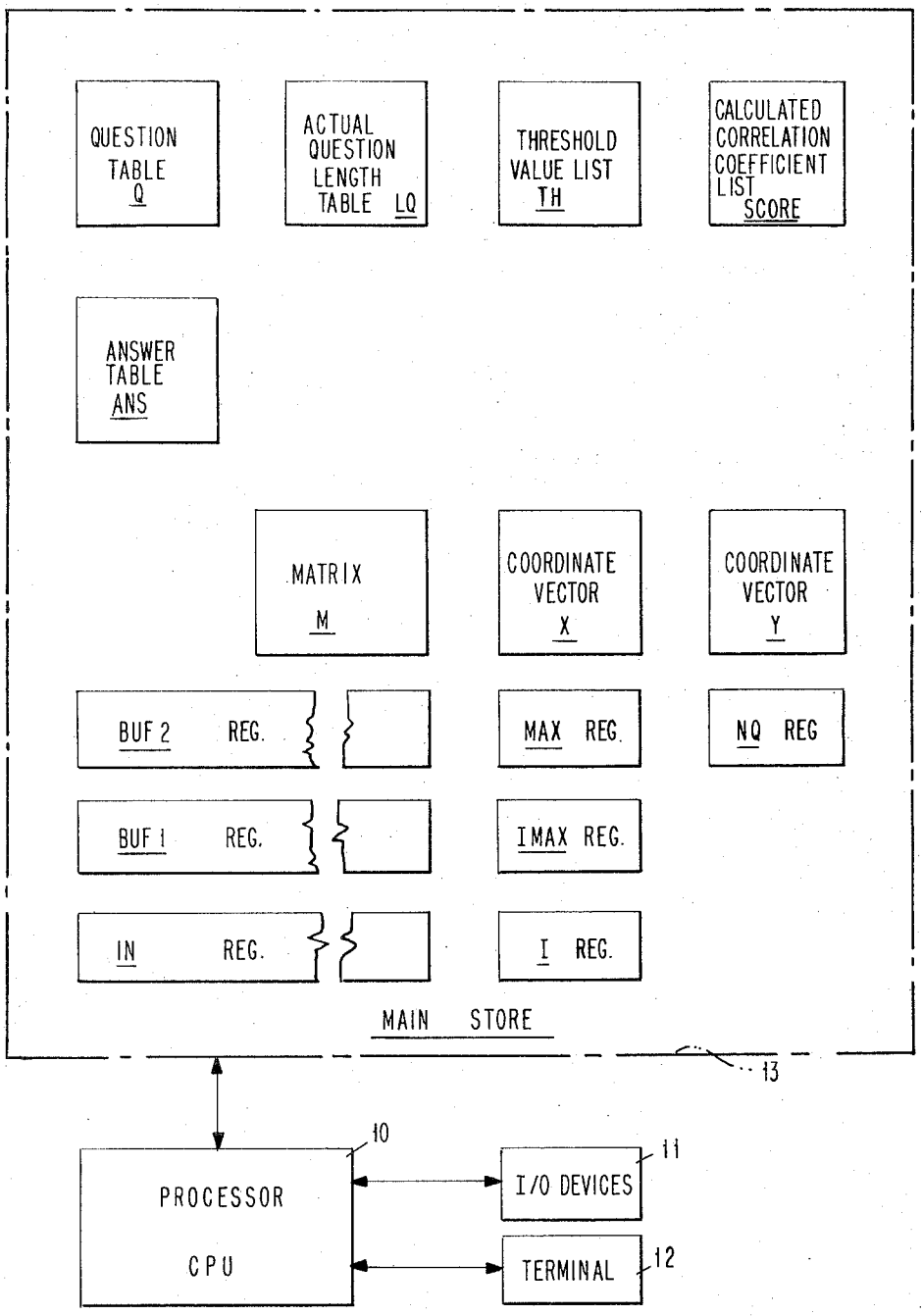
Figure 4:
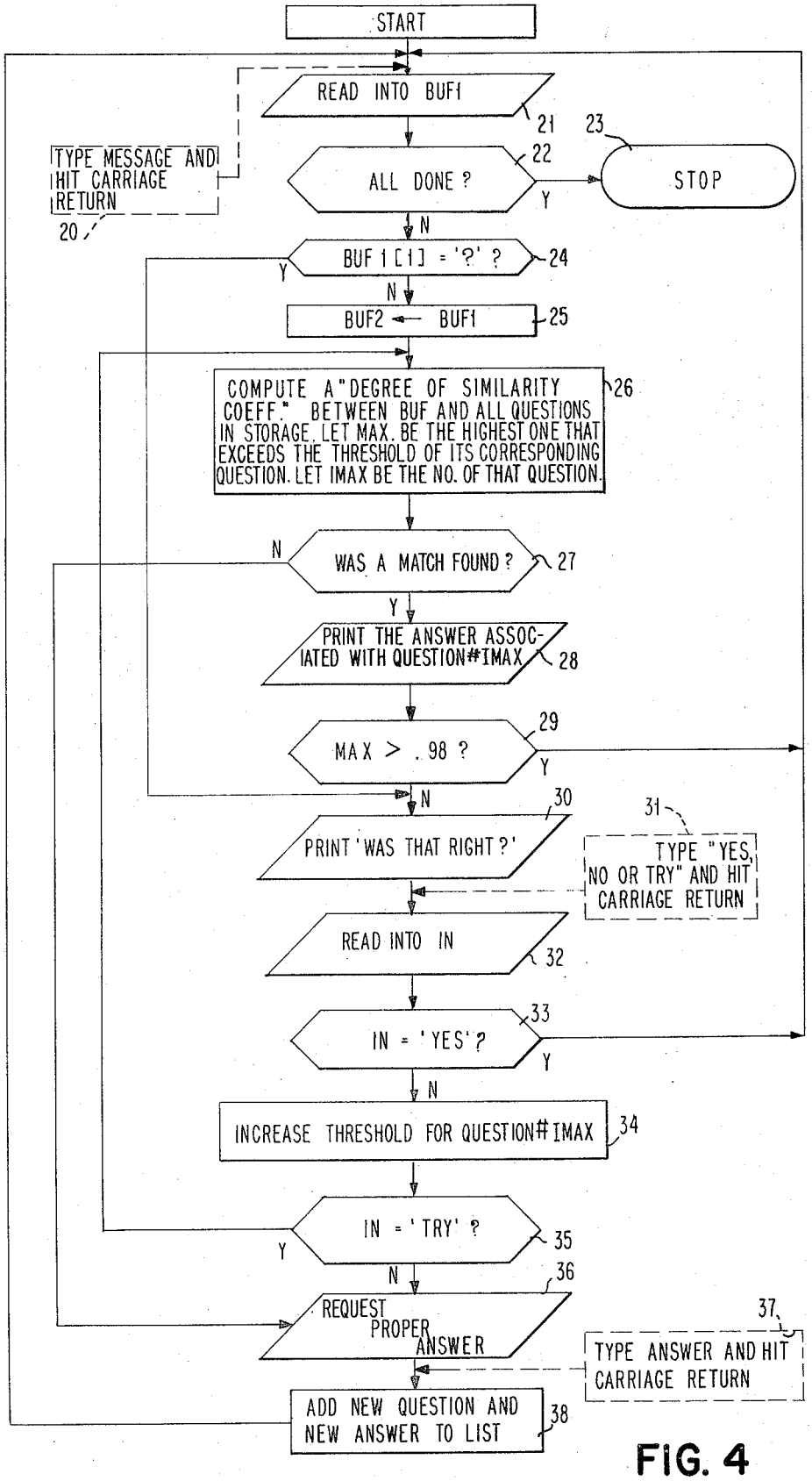
Figure 5:
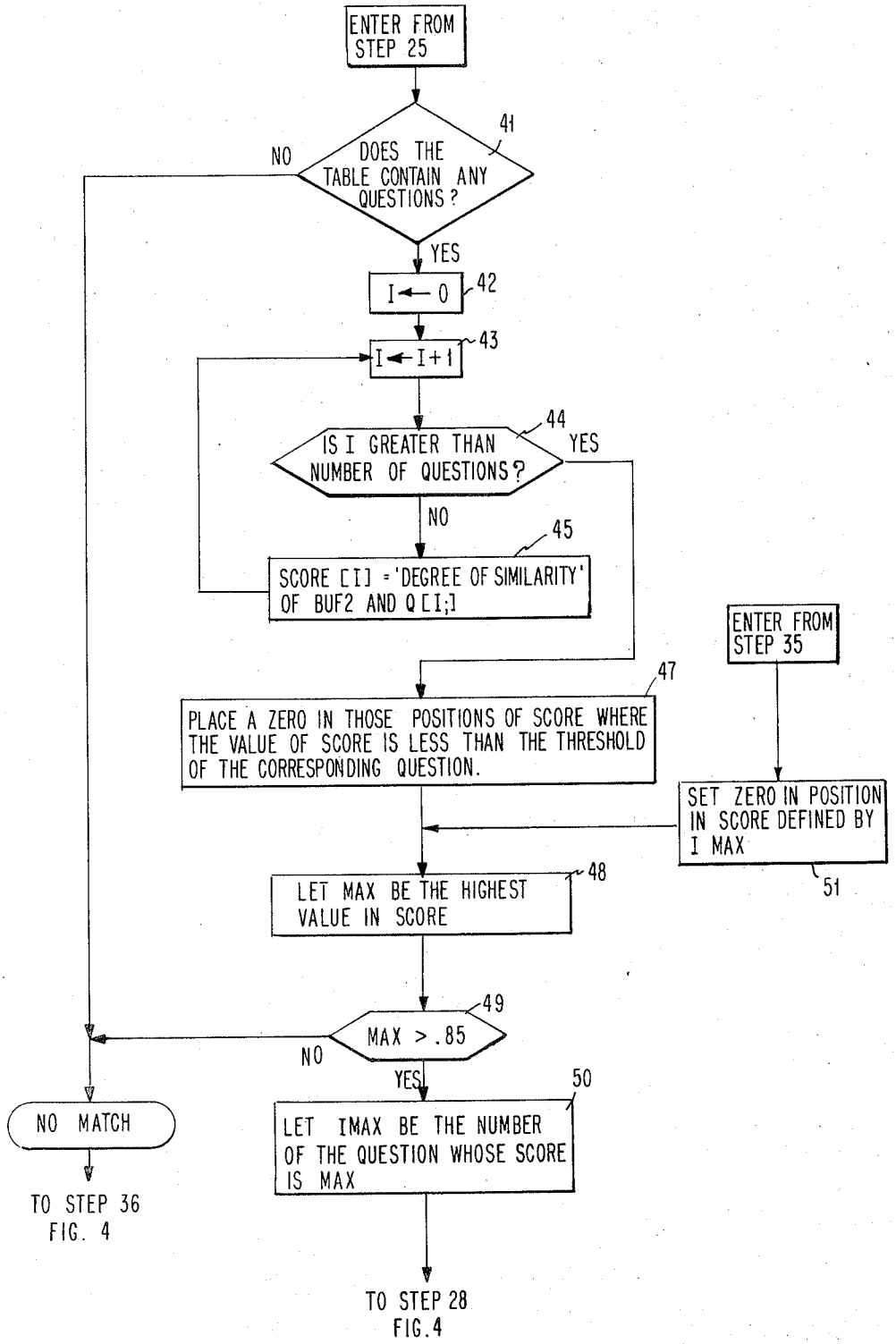

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 10

T922,008

DATA PROCESSOR PROGRAM FOR DETERMINING CHARACTER STRING SIMILARITY

Donald C. Gause, Owego, and Eduardo Kellerman and Gerald L. Rouse, Endicott, N.Y., assignors to International Business Machines Corporation, Armonk, N.Y.

Continuation of application Ser. No. 154,093, June 17, 1971. This application Oct. 18, 1973, Ser. No. 407,733

Int. Cl. G05b *19/28;* G06f *7/34*

U.S. Cl. 444—1

4 Sheets Drawing. 27 Pages Specification

An improved program method is shown for determining the similarity of two character strings where they are not necessarily equal character by character. Each character of one character string is compared with each character of the other character string, and the results are stored in a matrix. Each row of the matrix corresponds to a respective one of the characters of the first string, and each column of the matrix corresponds to a respective character of the other string. A logical one value is stored in each matrix position where corresponding characters of the first and second string are equal, and a logical zero is stored in each position where they are not equal. In the event that there is more than one logical one in each row (or in each column, or both), all of the logical ones in that row (or column, or both) except that which is closest to the major diagonal of the matrix are changed to logical zero. In the event that two logical ones in a row (or column, or both) are equidistant from the major diagonal, both may be retained. The remaining logical ones in the matrix are then considered as points on an X, Y coordinate system, and the standard correlation coefficient (which measures linear dependence) of the points is calculated to determine the degree of similarity between the two character strings. A decision that sufficient similarity exists to make a determination that a match has occurred may be based upon various known tests, for example, exceeding predetermined thresholds; or, in the event that a match is made against several character strings, the highest coefficient calculated can be determined as the match. The improved method can be used in programming areas such as inquiry (or query) systems and the job control language processor of an operat-

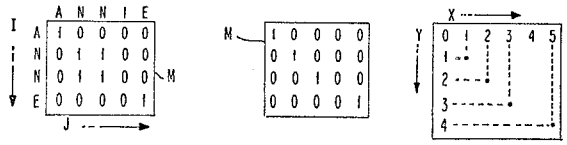

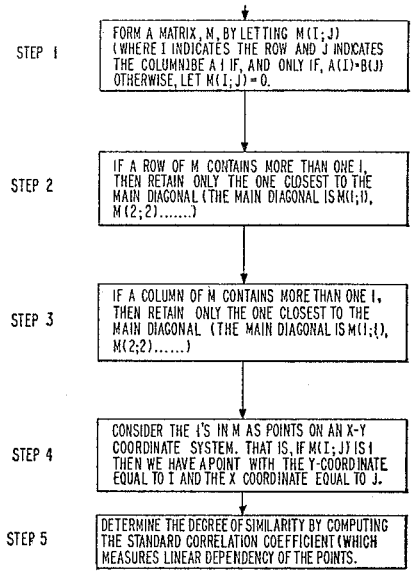

ing system. The program usually handles missing characters, transposed characters and other common errors. The program can be either a fixed or an adaptive type.

INVENTORS
EDUARDO KELLERMAN
GERALD L. ROUSE
DONALD C. GAUSE

BY John C. Black
ATTORNEY